(12) United States Patent
Takamori et al.

(10) Patent No.: US 9,106,165 B2
(45) Date of Patent: Aug. 11, 2015

(54) VOLTAGE OUTPUT CIRCUIT, LOAD DRIVE CIRCUIT, AND METHOD FOR OUTPUTTING VOLTAGE

(71) Applicant: Semiconductor Components Industries, LLC, Phoenix, AZ (US)

(72) Inventors: Yasuyuki Takamori, Gunma-ken (JP); Shinobu Shioda, Gunma-ken (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 257 days.

(21) Appl. No.: 13/766,109

(22) Filed: Feb. 13, 2013

(65) Prior Publication Data
US 2013/0207583 A1    Aug. 15, 2013

(30) Foreign Application Priority Data

Feb. 14, 2012  (JP) ................................. 2012-029868

(51) Int. Cl.
| | |
|---|---|
| H03L 7/00 | (2006.01) |
| H02P 6/14 | (2006.01) |
| H02M 7/537 | (2006.01) |
| H02M 3/07 | (2006.01) |

(52) U.S. Cl.
CPC . H02P 6/14 (2013.01); H02M 3/07 (2013.01); H02M 7/537 (2013.01)

(58) Field of Classification Search
CPC ....................................................... G05F 1/10

USPC ......... 318/400.05, 400.26, 799, 801, 807, 37, 318/119, 808, 810, 812, 723, 503, 504; 327/157, 191, 530, 548, 535, 536, 537; 324/436, 442; 329/302; 331/13, 23, 47, 331/34, 40, 41, 44, 48, 54, 57
See application file for complete search history.

(56) References Cited

U.S. PATENT DOCUMENTS

| | | | | |
|---|---|---|---|---|
| 6,052,022 | A * | 4/2000 | Lee | 327/589 |
| 6,084,483 | A * | 7/2000 | Keshtbod | 331/57 |
| 7,298,198 | B2 * | 11/2007 | Stopel | 327/536 |
| 7,521,986 | B2 * | 4/2009 | Mitsuda | 327/530 |
| 7,586,379 | B2 * | 9/2009 | Shimizu | 331/16 |

FOREIGN PATENT DOCUMENTS

JP          2009-177894 A       8/2009

OTHER PUBLICATIONS

Patent Abstracts of Japan, Publication No. 2009-177894, Published on Aug. 6, 2009, 1 page.

* cited by examiner

*Primary Examiner* — Antony M Paul
(74) *Attorney, Agent, or Firm* — Rennie William Dover

(57) ABSTRACT

A voltage output circuit includes: an oscillator circuit configured to output an oscillation signal while changing an oscillation frequency thereof; and a voltage generating circuit configured to convert a first voltage into a second voltage higher than the first voltage, and output the second voltage, based on the oscillation signal.

15 Claims, 5 Drawing Sheets

VOLTAGE OUTPUT CIRCUIT, LOAD DRIVE CIRCUIT, AND METHOD FOR OUTPUTTING VOLTAGE

CROSS-REFERENCE TO RELATED APPLICATION

This application claims the benefit of priority to Japanese Patent Application No. 2012-029868, filed Feb. 14, 2012, of which full contents are incorporated herein by reference.

BACKGROUND OF THE INVENTION

1. Field of the Invention

The present invention relates to a voltage output circuit, a load drive circuit, and a method for outputting a voltage.

2. Description of the Related Art

Today, while motors are incorporated in a variety of electric products, such electric products consume a comparatively large amount of power as well as cause noise. Thus, various techniques are developed (see, e.g., Japanese Laid-Open Patent Publication No. 2009-177894).

A motor drive circuit is usually configured such that two transistors connected in series between a power supply and the ground are provided for a coil of each phase, and the coil is connected to a connection point of these two transistors. Then these transistors are on/off controlled in appropriate timing, thereby on/off controlling energization of each coil to rotate the motor.

At this time, in order to turn on the transistor on the upper arm side (power supply side) out of the two transistors connected in series, a voltage between a control terminal (e.g., gate terminal) and the connection point is required to be set higher than the predetermined threshold voltage. When the transistor on the upper arm side is turned on, however, the potential at the connection point increases up to close to a power supply voltage, and thus a voltage higher than the power supply voltage is required to be applied to the control terminal.

Therefore, it is necessary to generate a voltage higher than the power supply voltage using a voltage generating circuit such as a charge pump circuit, however, an oscillation signal such as a clock signal is required for the voltage generating circuit such as the charge pump circuit. Thus, the noise caused by this oscillation signal is generated. This noise is generated centering on a particular frequency according to the frequency of the oscillation signal, which can cause a significant effect on other surrounding electronic devices. This may occur similarly in the case where loads other than the motor are used.

SUMMARY OF THE INVENTION

A voltage output circuit according to an aspect of the present invention includes: an oscillator circuit configured to output an oscillation signal while changing an oscillation frequency thereof; and a voltage generating circuit configured to convert a first voltage into a second voltage higher than the first voltage, and output the second voltage, based on the oscillation signal.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

A description will be given of a configuration example of a load drive circuit 1000 and a voltage output circuit 2000 of an embodiment of the present invention with reference to FIGS. 1 to 5.

==Load Drive Circuit and Voltage Output Circuit==

Figure 1:
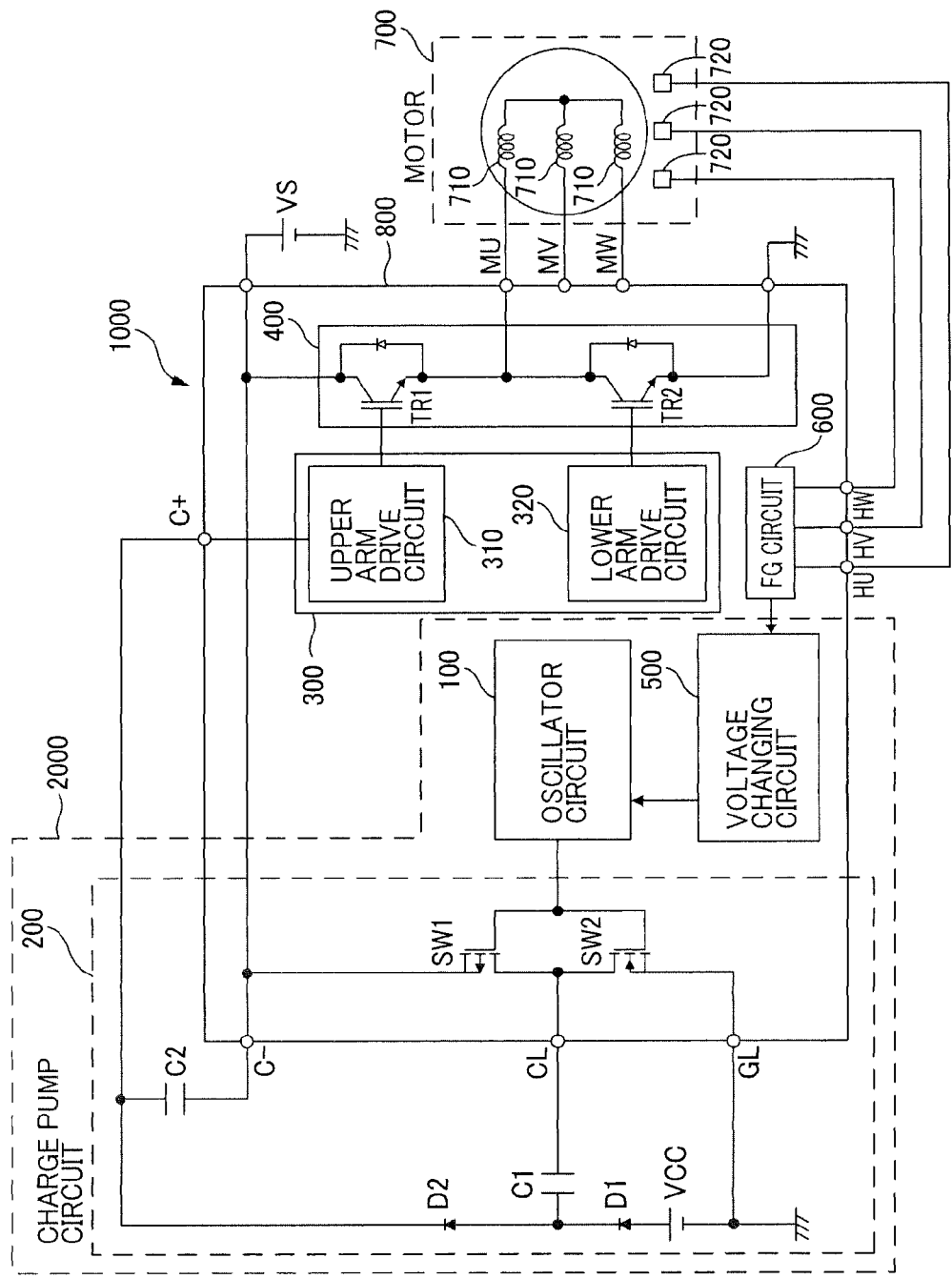
FIG. 1 is a diagram illustrating a configuration example of a load drive circuit and a voltage output circuit according to an embodiment of the present invention.

As depicted in FIG. 1, the load drive circuit 1000 according to an embodiment of the present invention includes a charge pump circuit 200, a transistor drive circuit 300, an output circuit 400, an FG circuit 600, a voltage changing circuit 500, and an oscillator circuit 100. The voltage output circuit 2000 according to an embodiment of the present invention includes the charge pump circuit 200, the voltage changing circuit 500, and the oscillator circuit 100.

In the following description, a description will be given of the case, as an example, where the load drive circuit 1000 is a motor drive circuit configured to drive a three-phase motor 700. Needless to say, the load drive circuit 1000 is also applicable to the case of driving loads other than the motor 700.

In an embodiment of the present invention, the load drive circuit 1000 and the voltage output circuit 2000 are configured such that some constituent elements of the charge pump circuit 200 are connected to predetermined terminals of a motor drive IC 800, as depicted in FIG. 1.

<Charge Pump Circuit>

The charge pump circuit 200 is a circuit configured to convert a constant power supply voltage VCC (first voltage) into a second voltage and output the second voltage, when an oscillation signal is inputted from the oscillator circuit 100, which will be described later.

The charge pump circuit 200 includes transistors SW1 and SW2, the constant power supply voltage VCC, capacitors C1 and C2, and diodes D1 and D2.

The transistors SW1 and SW2 are connected in series between a power supply voltage VS and the ground. Specifically, the source terminal of the transistor SW1 is connected to the power supply voltage VS, the drain terminal of the transistor SW1 and the drain terminal of the transistor SW2 are connected at the connection point, and the source terminal of the transistor SW2 is connected to the ground. The oscillation signal outputted from the oscillator circuit 100 is inputted to the gate terminal of each of the transistors SW1 and SW2.

One end of the capacitor C1 is connected to the connection point between the transistors SW1 and SW2 via a "CL" terminal of the motor drive IC 800. The other end of the capacitor C1 is connected to the cathode of the diode D1. The anode of this diode D1 is connected to the constant power supply voltage VCC.

Whereas, the cathode of the diode D1 is connected to the anode of the diode D2 as well.

The capacitor C2 has one end thereof connected to the source terminal of the transistor SW1 and the power supply voltage VS via a "C−" terminal of the motor drive IC 800, and has the other end thereof connected to the cathode of the diode D2. The other end of the capacitor C2 is connected to the transistor drive circuit 300 via a "C+" terminal of the motor drive IC 800.

In the configuration in which the charge pump circuit 200 is connected as such, when the oscillation signal from the oscillator circuit 100 is inputted to the gate terminal of each of the transistors SW1 and SW2, the transistors SW1 and SW2 repeat on and off alternately in synchronization with the oscillation signal.

Firstly, when the transistor SW1 is turned off and the transistor SW2 is turned on, the voltage at the connection point between the transistors SW1 and SW2, i.e., the "CL" terminal of the motor drive IC 800 reaches 0 volt. On the other hand, the capacitor C1 is charged by a current flowing from the constant power supply voltage VCC via the diode D1.

In this state, when the transistor SW1 is changed from off to on and the transistor SW2 is changed from on to off, the voltage at the one end of the capacitor C1, i.e., the voltage at the "CL" terminal of the motor drive IC 800, increases to a voltage almost equal to the power supply voltage VS. Thus, the voltage at the other end of the capacitor C1 also increases, and the current flows to the capacitor C2 via the diode D2. The capacitor C2 is charged by this current.

With the transistors SW1 and SW2 repeating on and off alternately in synchronization with the oscillation signal from the oscillator circuit 100, the voltage of the capacitor C2 increases to a voltage (second voltage) higher than the power supply voltage VS.

The voltage of the capacitor C2 is applied, as an output voltage of the charge pump circuit 200, to the transistor drive circuit 300 via the "C+" terminal of the motor drive IC 800.

<Transistor Drive Circuit>

The transistor drive circuit 300 is a circuit configured to apply the output voltage, generated by the charge pump circuit 200, to a control terminal (gate terminal, base terminal, etc.) of transistors TRs included in the output circuit 400, thereby turning on the transistors TRs.

The transistor drive circuit 300 includes an upper arm drive circuit 310 and a lower arm drive circuit 320. The upper arm drive circuit 310 is a circuit configured to apply the output voltage, generated by the charge pump circuit 200, to the control terminal of the transistor TR connected on the power supply voltage VS side out of the transistors TRs included in the output circuit 400. The lower arm drive circuit 320 is a circuit configured to apply the output voltage generated by the charge pump circuit 200 to the control terminal of the transistor TR connected on the ground side out of the transistors TRs included in the output circuit 400.

<Output Circuit>

The output circuit 400 includes the transistors TRs (electronic devices) for performing on/off control of the motor 700. The output circuit 400 according to an embodiment of the present invention is configured such that two transistors TRs are connected in series between the power supply voltage VS and the ground. A coil 710 of the motor 700 is connected to the connection point between these two transistors TRs.

Since the motor 700 according to an embodiment of the present invention is a three-phase motor, a pair of two transistors TRs connected in series is provided for each phase, resulting in that three pairs thereof are provided in total. Although FIG. 1 depicts only the pair of two transistors TR1 and TR2 provided with respect to U phase, for the sake of simplification, a configuration is made similarly with respect to other phases (V phase and W phase) as well.

These transistors TRs are on/off-controlled in accordance with control voltages applied to the control terminals of transistors TR, respectively, by the transistor drive circuit 300, thereby on/off-controlling the energization of each of the coils in the motor 700.

The transistor TR included in the output circuit 400 may be realized by IGBT (Insulated Gate Bipolar Transistor) or may be realized by MOSFET (Metal-Oxide-Semiconductor Field-Effect Transistor), for example.

When describing the case of MOSFET, a configuration may be such that the transistor TR included in the output circuit 400 is closed between the drain and the source when a voltage greater than a gate-source threshold voltage is applied to the gate terminal thereof or the transistor TR is opened between the drain and the source when the voltage greater than the gate-source threshold voltage is applied to the gate terminal thereof.

<Motor>

The motor 700 includes the coils (load) 710 of the phases and Hall ICs 720 configured to detect the rotation of the motor 700.

Each of the Hall ICs 720 detects a change in magnetism when the motor 700 rotates, and outputs a pulse signal. Thus, the Hall IC 720 outputs a pulse signal having a frequency corresponding to the rotational speed of the motor 700. The motor 700 according to an embodiment of the present invention is of four pole-pairs (eight poles), for example. Thus, the Hall IC 720 outputs four pulses per rotation of motor.

In an embodiment of the present invention, the motor 700 includes three Hall ICs 720, and these three Hall ICs 720 output their respective pulse signals during one rotation of the motor 700. These pulse signals are inputted to an "HU" terminal, an "HV" terminal, and an "HW" terminal of the motor drive IC 800.

<FG Circuit>

The FG circuit 600 is a circuit configured to receive the pulse signals from the Hall ICs 720, generates an FG signal indicative of the rotational state of the motor, using these pulse signals, and output this FG signal as a clock signal to the voltage changing circuit 500, which will be described later.

The position of a rotor is detected using a position detecting element such as the Hall IC 720 provided in the motor 700, for example, thereby being able to generate the FG signal.

In the motor drive circuit of a senseless drive system without the position detecting element, the position of the rotor is detected using the induced voltage (reverse voltage) generated in the drive coil 710 of the motor 700, thereby being able to generate the FG signal.

<Voltage Fluctuating Circuit>

The voltage changing circuit 500 is a circuit configured to oscillate an applied voltage VCNT applied to the oscillator circuit 100, which will be described later. Although the details will be described later, the voltage changing circuit 500 is configured to change the applied voltage VCNT within the range in which the level of the output voltage outputted from the charge pump circuit 200 reaches the level capable of turning on the transistor TR of the output circuit 400.

Figure 2:
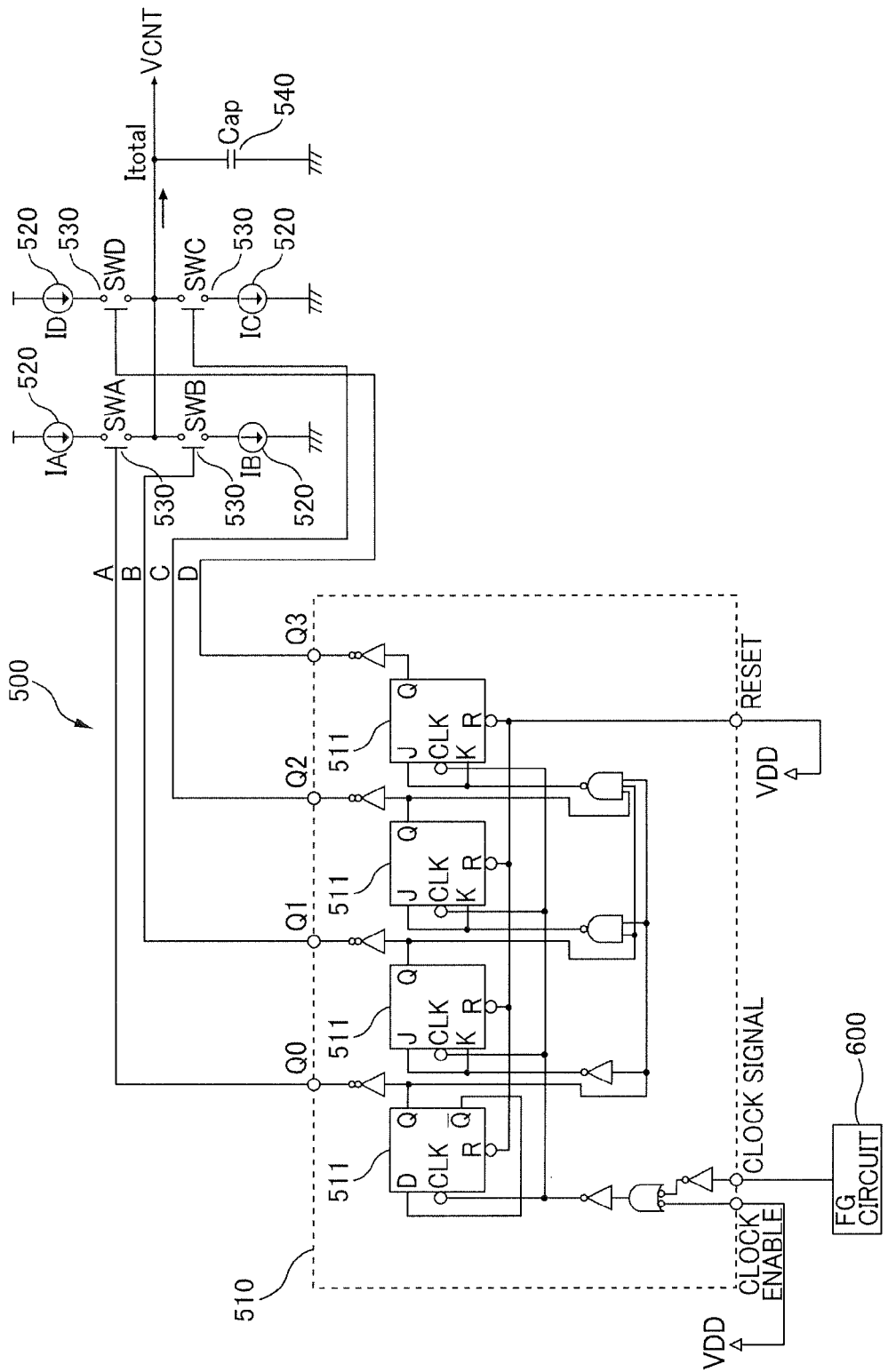
FIG. 2 is a diagram illustrating a configuration example of a voltage changing circuit according to an embodiment of the present invention.

The voltage changing circuit 500 includes a counter circuit 510, switches 530, current sources 520, and a capacitor 540 with one end grounded, as depicted in FIG. 2. The voltage between the one end and the other end of the capacitor 540 is outputted as the applied voltage VCNT.

The counter circuit 510 is configured such that four flip-flops 511 are connected in series. The counter circuit 510 is configured to update the logic level (0 or 1) of output signals (A, B, C, and D) of the flip-flops 511 and outputs the output signals, in accordance with the clock signal outputted from the FG circuit 600.

The voltage changing circuit 500 includes four switches 530. These four switches 530 are associated with the output signals (A, B, C, and D) of the four flip-flops 511, respectively, and are opened/closed in accordance with the logic levels of these output signals, respectively. Specifically, for example, when the logic level of the output signal of the flip-flop 511 is "1", the switch 530 is closed, and when the logic level thereof is "0", the switch 530 is opened.

In the following description, when a description is given individually of the four switches 530, the switches 530 corresponding to the output signals (A, B, C, and D) of the flip-flops 511 are given as SWA, SWB, SWC, and SWD, respectively.

The current sources 520 are connected in series to these switches 530, respectively. Some of the current sources 520 are connected to the capacitor 540 on the other end side thereof in the direction in which the capacitor 540 is charged, and others of the current sources 520 are connected to the capacitor 540 on the other end side thereof in the direction in which the capacitor 540 is discharged.

In an embodiment of the present invention, the current source 520 connected in series to the SWA 530 and the current source 520 connected in series to the SWD 530 are connected to the capacitor 540 in the direction in which the capacitor 540 is charged, and the current source 520 connected in series to the SWB 530 and the current source 520 connected in series to the SWC 530 are connected to the capacitor 540 in the direction in which the capacitor 540 is discharged.

Thus, when at least one of the SWA 530 and the SWD 530 is closed, the current flows so that the capacitor 540 is charged. Whereas, when at least one of the SWB 530 and the SWC 530 is closed, the current flows so that the capacitor 540 is discharged. By the combinations of opening and closing of the SWA 530, the SWB 530, the SWC 530, and the SWD 530, the capacitor 540 is charged or discharged integrally, thereby increasing or decreasing the voltage VCNT of the capacitor 540 on the other end side.

Figure 3:
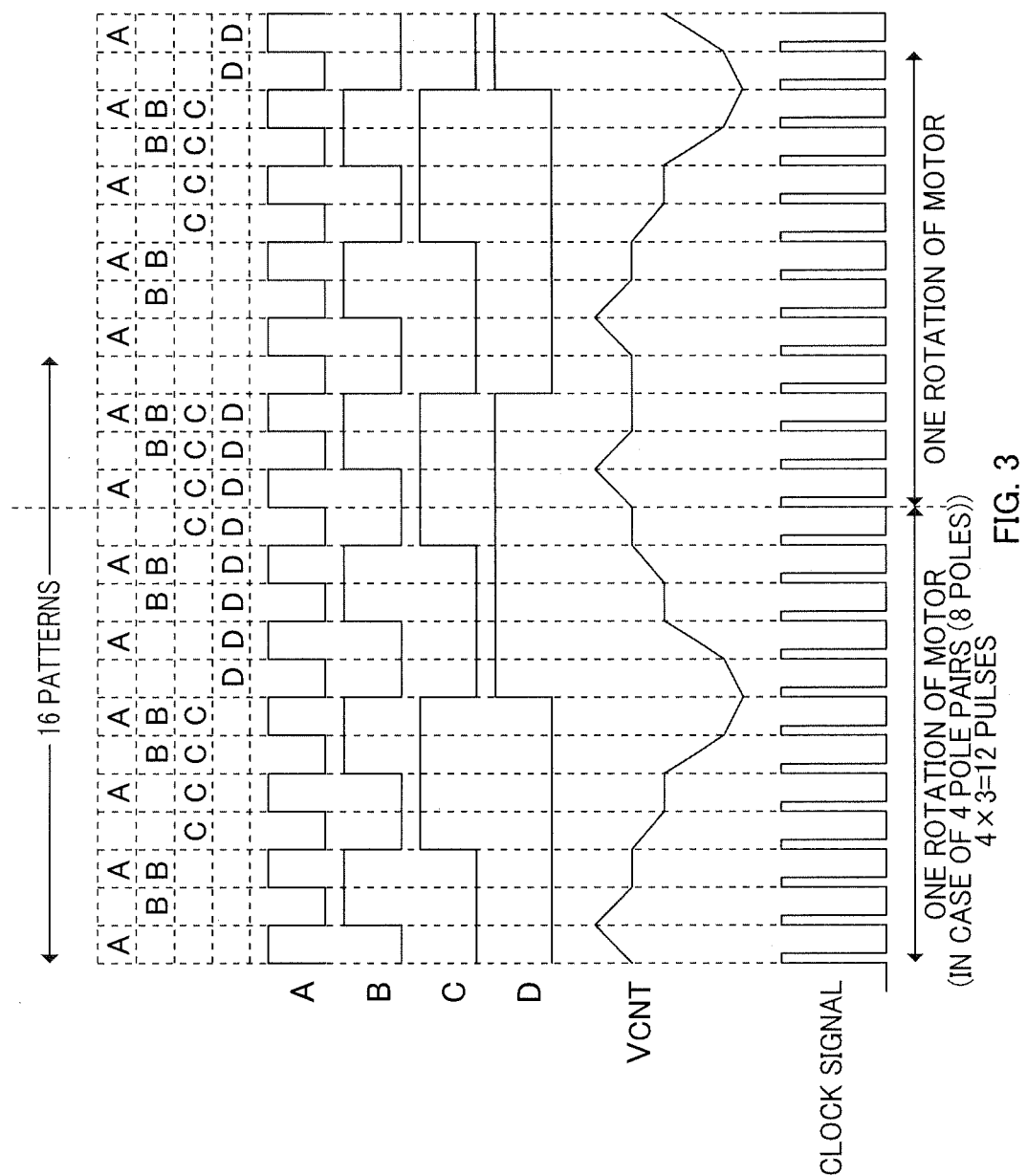
FIG. 3 is a diagram illustrating an operation of the voltage changing circuit according to an embodiment of the present invention.

FIG. 3 depicts how the output signal of each of the flip-flops 511 of the counter circuit 510 is updated as well as the voltage VCNT of the capacitor 540 is changed according to the logic level of the output signal of each of the flip-flops 511, in synchronization with the clock signal inputted from the FG circuit 600.

In an embodiment of the present invention, there are 16 combinations of the logic levels of the output signals of the four flip-flops 511, and the number of combinations of charging to the capacitor 540 are equal to the number of combinations of discharging from the capacitor 540, and thus the voltage VCNT of the capacitor 540 repeats a periodic change with the voltage of the predetermined level, set in advance, used as the reference (center), every time 12 pulses of the clock signal are inputted. That is, the voltage VCNT of the capacitor 540 returns to the original voltage every time 12 pulses of the clock signals are inputted.

Therefore, if this reference voltage and the fluctuation range of the voltage are set in advance so that the output voltage outputted from the charge pump circuit 200 has a level within the range capable of turning on the transistor TR of the output circuit 400, which enable the output voltage from the charge pump circuit 200 not to deviate from the level capable of turning on the transistor TR of the output circuit 400.

The fluctuation range of the voltage VCNT of the capacitor 540 can be set at a desired value by setting the capacitance of the capacitor 540, the current values of the current sources 520, the time period during which the switch 530 is on, the number (the number of stages) of the flip-flops 511 of the counter circuit 510, etc.

Since the FG signal is outputted as the clock signal from the FG circuit 600, the motor 700 makes one rotation every time 12 pulses (4×3) of the clock signal are inputted.

Thus, the fluctuation cycle of the voltage VCNT with respect to one rotation of the motor 700 can be changed by changing the frequency of the clock signal.

<Oscillator Circuit>

The oscillator circuit 100 is a circuit configured to output the oscillation signal of the switching speed corresponding to the level of the applied voltage VCNT that is outputted from the voltage changing circuit 500.

Figure 4:
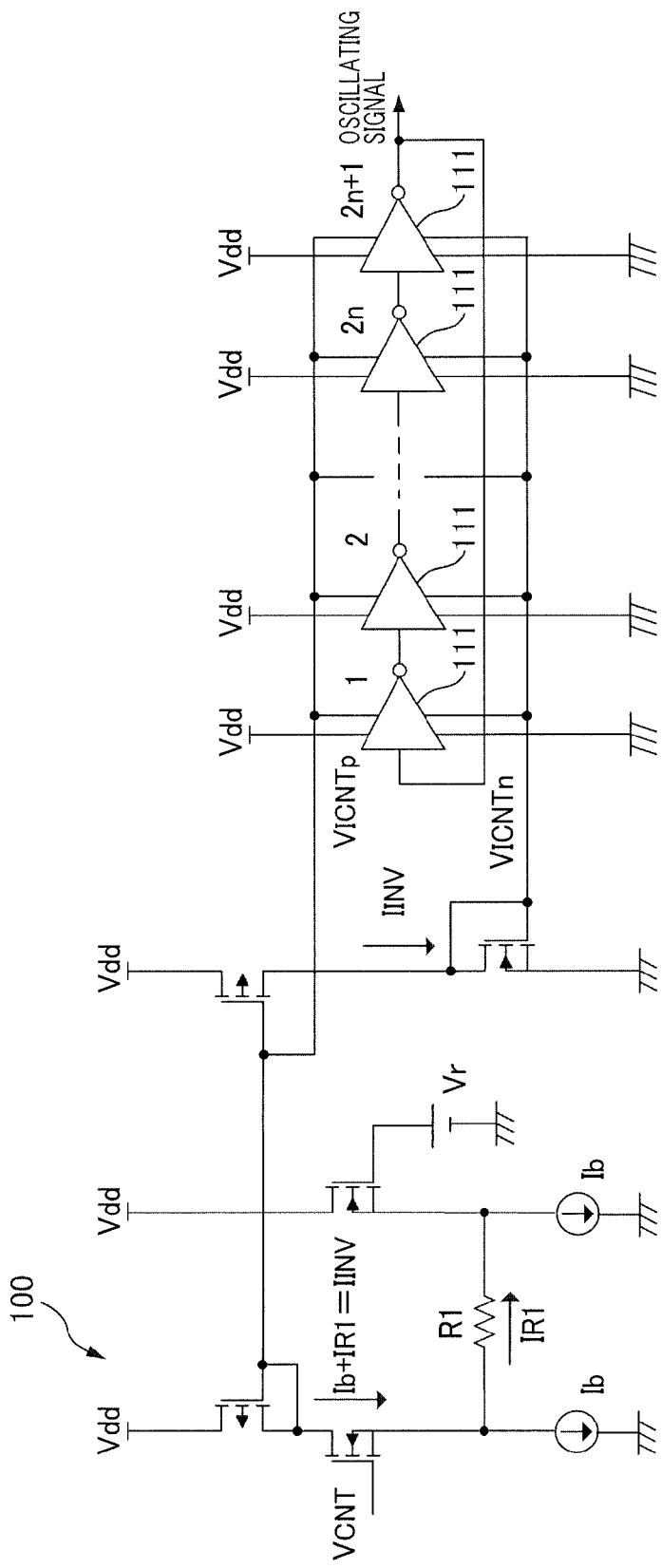
FIG. 4 is a diagram illustrating a configuration example of an oscillator circuit according to an embodiment of the present invention.

One example of the oscillator circuit 100 is depicted in FIG. 4. The oscillator circuit 100 is configured as a ring oscillator includes an odd number of inverter circuits 111 that are ring-connected.

Figure 5:
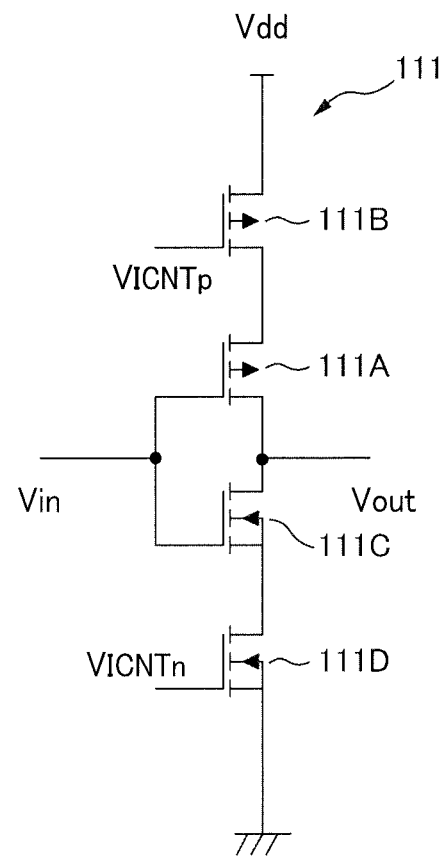
FIG. 5 is a diagram illustrating a configuration example of an inverter circuit according to an embodiment of the present invention.

Each of the inverter circuits 111 is configured as depicted in FIG. 5, for example. In FIG. 5, the inverter circuit 111 is configured to output an output voltage Vout obtained by inverting the logic level of an input voltage Vin. When the input voltage Vin is inverted, the output voltage Vout is inverted and outputted after a predetermined delay.

Each of the inverter circuits 111 is configured with a first NMOSFET 111A, a second NMOSFET 111B, a first PMOSFET 111C, and a second PMOSFET 111D. The gates of the first NMOSFET 111A and the first PMOSFET 111C are connected to each other and the drains of the first NMOSFET 111A and the first PMOSFET 111C are connected to each other. That is, the first NMOSFET 111A and the first PMOSFET 111C are connected so as to act as an inverter that inverts the input voltage Vin and outputs the output voltage Vout. The second NMOSFET 111B is connected in series between a power supply Vdd and the first NMOSFET 111A, and the second PMOSFET 111D is connected in series between the first PMOSFET 111C and the ground. A voltage VICNTp that changes with increase/decrease in the applied voltage VCNT is applied to the gate of the second NMOSFET 111B. A voltage VICNTn that changes with increase/decrease in the applied voltage VCNT in the direction opposite to the change in the voltage VICNTp is applied to the gate of the second PMOSFET 111D.

In FIG. 5, when the voltage VICNTp is decreased and the voltage VICNTn is increased, the charging/discharging speed with respect to the parasitic capacitance, etc., in the inverter circuit 111 is increased, resulting in decrease in the delay time of the inverter circuit 111. That is, the response time, which is a time period from inverting of the input voltage Vin until inverting of the output voltage Vout, is decreased in level.

Whereas, when the voltage VICNTp is increased and the voltage VICNTn is decreased, the charging/discharging speed with respect to the parasitic capacitance, etc., in the inverter circuit 111 is decreased, resulting in increase in the delay time of the inverter circuit 111. That is, the response time, which is a time period from inverting of the input voltage Vin until inverting of the output voltage Vout is increased in level.

Firstly, when the applied voltage VCNT applied to the oscillator circuit 100 increases above Vr, a current IR1 flows through a resistor R1 in the direction indicated by an arrow in FIG. 4 in accordance with increase in the applied voltage VCNT, which results in increase in current IINV. Then, the current IINV is increased, thereby decreasing the voltage VICNTp and increasing the voltage VICNTn. Thus, in this case, since the response time of the inverter circuit 111 is decreased, the frequency of the oscillation signal is increased.

Whereas, when the applied voltage VCNT applied to the oscillator circuit 100 decreases below Vr, the current IR1 flows through the resistor R1 in the direction opposite to that indicated by the arrow in FIG. 4 in accordance with decrease in the applied voltage VCNT, which results in decrease in current IINV. Then, the current IINV is decreased, thereby increasing the voltage VICNTp and decreasing the voltage VICNTn. Thus, in this case, since the response time of the inverter circuit 111 is increased, the frequency of the oscillation signal is decreased.

As such, the switching speed of the oscillation signal outputted from the oscillator circuit 100 changes with the level of the applied voltage VCNT outputted from the voltage changing circuit 500.

This oscillation signal is inputted to the charge pump circuit 200 described above, and the transistors SW1 and SW2 configuring the charge pump circuit 200 repeat on and off in an alternate manner in synchronization with this oscillation signal.

As such, according to the load drive circuit 1000 according to an embodiment of the present invention, it is possible to change the switching speed of the oscillation signal inputted to the charge pump circuit 200.

Thus, the frequency of the noise caused by this oscillation signal can be diffused, thereby being able to reduce the peak of the noise generated from the charge pump circuit 200.

This makes it possible, for example, to reduce the effect caused by the noise on other electronic devices. For example, when using the load drive circuit 1000 and the voltage output circuit 2000 according to an embodiment of the present invention in vehicle-mounted electronic devices such as a car air conditioner, it becomes possible to reduce the effect on other vehicle-mounted electronic devices such as a car radio and a transceiver. Similarly, when using the load drive circuit 1000 and the voltage output circuit 2000 according to an embodiment of the present invention in an air conditioner, an air cleaner, a water heater, etc., it becomes possible to reduce the effect on other surrounding electronic devices, irrespective of whether they are in vehicle-mounted use or not.

The above embodiments of the present invention are simply for facilitating the understanding of the present invention and are not in any way to be construed as limiting the present invention. The present invention may variously be changed or altered without departing from its spirit and encompass equivalents thereof.

For example, in an embodiment described above, a description has been given of an example of the case where the charge pump circuit 200 is used, but an embodiment of the present invention can be applied similarly in the case where a booster circuit using the coil and a bootstrap circuit, etc., are used.

Further, a description has been given citing the example of the case where a ring oscillator is used as the oscillator circuit 100, but the oscillator circuit can also be configured with a pseudo random number oscillator circuit capable of performing a pseudo random-number oscillation with respect to the switching frequency within a certain range, for example.

What is claimed is:

1. A voltage output circuit, comprising:
   an oscillator circuit configured to output an oscillation signal while changing an oscillation frequency thereof, the oscillator circuit configured to output the oscillation signal having the oscillation frequency determined according to a level of an applied voltage and to increase the oscillation frequency of the oscillation signal with increase in level of the applied voltage, and decrease the oscillation frequency of the oscillation signal with decrease in level of the applied voltage, wherein the oscillator circuit includes an odd number of a plurality of inverter circuits ring-connected and wherein each inverter circuit of the plurality of inverter circuits has a response time that decreases with an increase in level of the applied voltage, which response time is a time period from when an input voltage is inverted until when an output voltage is inverted, and has the response time increased with decrease in level of the applied voltage; and
   a voltage generating circuit configured to convert a first voltage into a second voltage higher than the first voltage, and output the second voltage, based on the oscillation signal.

2. The voltage output circuit of claim 1, wherein
the plurality of inverter circuits each include first and second NMOSFETs and first and second PMOSFETs, wherein
the first NMOSFET and the first PMOSFET are inverter-connected to each other, wherein
the second NMOSFET is connected in series between a power supply and the first NMOSFET, wherein
the second PMOSFET is connected in series between the first PMOSFET and the ground, wherein
a gate voltage of the second NMOSFET decreases in level as well as the gate voltage of the second PMOSFET increases in level, as the applied voltage increases in level, and wherein
a gate voltage of the second NMOSFET increases in level as well as the gate voltage of the second PMOSFET decreases in level, as the applied voltage decreases in level.

3. The voltage output circuit of claim 2, wherein
the oscillator circuit includes a circuit configured to apply, to gates of the second NMOSFET and the second PMOSFET of each of the plurality of inverter circuits, a voltage to decrease a gate voltage of the second NMOSFET in level as well as increase a gate voltage of the second PMOSFET in level, as the applied voltage increases in level; and increase the gate voltage of the second NMOSFET in level as well as decrease the gate voltage of the second PMOSFET in level, as the applied voltage decreases in level.

4. The voltage output circuit of claim 1, further comprising:
a voltage changing circuit configured to change the applied voltage in level.

5. The voltage output circuit of claim 4, wherein
the voltage changing circuit includes:
a counter circuit includes a plurality of flip-flops connected in series, and is configured to update a logic level of an output signal of each of the plurality of flip-flops in accordance with a predetermined clock signal;
a plurality of switches each configured to be opened or closed in accordance with a logic level of the output signal of each of the plurality of flip-flops;
a plurality of current sources connected in series to the plurality of switches, respectively; and
a capacitor having one end thereof grounded, wherein
some current sources out of the plurality of current sources are connected to the other end of the capacitor in a direction in which the capacitor is charged, and current sources excluding the some current sources out of the plurality of current sources are connected to an other end of the capacitor in a direction in which the capacitor is discharged, and wherein a voltage at the other end of the capacitor is outputted as the applied voltage.

6. The voltage output circuit of claim 1, wherein
the second voltage is applied to an electronic device to be on/off controlled as a control voltage of the electronic device.

7. The voltage output circuit of claim 6, wherein
a level of the second voltage changes within a range of a level capable of turning on the electronic device.

8. The voltage output circuit of claim 6, wherein
the electronic device includes transistors configured to on/off control energization of a load.

9. The voltage output circuit of claim 8, wherein
the load includes a coil configuring a motor.

10. The voltage output circuit of claim 9, wherein
the oscillator circuit is further configured to output the oscillation signal having the oscillation frequency determined according to a level of an applied voltage, and wherein
a voltage changing circuit configured to change the applied voltage in level generates the applied voltage based on an FG signal indicative of a rotational state of the motor.

11. A load drive circuit comprising:
an oscillator circuit configured to output an oscillation signal having an oscillation frequency that changes according to a level of an applied voltage, the oscillator circuit further configured to increase the oscillation frequency of the oscillation signal with increase in level of the applied voltage, and decrease the oscillation frequency of the oscillation signal with decrease in level that the applied voltage is decreased, wherein the oscillator circuit has an odd number of a plurality of inverter circuits ring-connected to one another and incorporated therein, and wherein each inverter circuit of the plurality of inverter circuits has a response time decreased with increase in level of the applied voltage, which response time is a time period from when an input voltage is inverted until when an output voltage is inverted, and has the response time increased with decrease in level of the applied voltage;
a voltage changing circuit configured to output the applied voltage;
a voltage generating circuit configured to convert a first voltage into a second voltage higher than the first voltage, and output the second voltage, based on the oscillation signal;
an output circuit configured to energize a load; and
a drive circuit configured to control an operation of the output circuit, based on the second voltage.

12. The load drive circuit of claim 11, wherein
the plurality of inverter circuits each include first and second NMOSFETs and first and second PMOSFETs, wherein
the first NMOSFET and the first PMOSFET are inverter-connected to each other, wherein
the second NMOSFET is connected in series between a power supply and the first NMOSFET, wherein
the second PMOSFET is connected in series between the first PMOSFET and the ground, wherein a gate voltage of the second NMOSFET decreases in level as well as the gate voltage of the second PMOSFET increases in level, as the applied voltage increases in level, and wherein
a gate voltage of the second NMOSFET increases in level as well as the gate voltage of the second PMOSFET decreases in level, as the applied voltage decreases in level.

13. The load drive circuit of claim 12, wherein
the oscillator circuit includes a circuit configured to apply, to gates of the second NMOSFET and the second PMOSFET of each of the plurality of inverter circuits, a voltage to decrease a gate voltage of the second NMOSFET in level as well as increase a gate voltage of the second PMOSFET in level, as the applied voltage increases in level; and increase the gate voltage of the second NMOSFET in level as well as decrease the gate voltage of the second PMOSFET in level, as the applied voltage decreases in level.

14. The load drive circuit of claim 11, wherein
the voltage changing circuit includes:
a counter circuit includes a plurality of flip-flops connected in series, and is configured to update a logic level of an output signal of each of the plurality of flip-flops in accordance with a predetermined clock signal;
a plurality of switches each configured to be opened or closed in accordance with a logic level of the output signal of each of the plurality of flip-flops;
a plurality of current sources connected in series to the plurality of switches, respectively; and
a capacitor having one end thereof grounded, wherein
some current sources out of the plurality of current sources are connected to the other end of the capacitor in a direction in which the capacitor is charged, and current sources excluding the some current sources out of the plurality of current sources are connected to an other end of the capacitor in a direction in which the capacitor is discharged, and wherein
a voltage at the other end of the capacitor is outputted as the applied voltage.

15. A method for outputting a voltage, comprising:
outputting an oscillation signal from an oscillator circuit while changing an oscillation frequency thereof, the oscillation frequency determined according to a level of an applied voltage and wherein the oscillation frequency increases with an increase in a level of an applied voltage and decreases with a decrease in the level of the applied voltage, and wherein the oscillator circuit the oscillator circuit has an odd number of a plurality of inverter circuits ring-connected to one another and incorporated therein, and wherein the plurality of inverter circuits each have a response time decreased with increase in level of the applied voltage, which response time is a time period from when an input voltage is inverted until when an output voltage is inverted, and has the response time increased with decrease in level of the applied voltage; and
converting a first voltage into a second voltage higher than the first voltage, and outputting the second voltage, based on the oscillation signal.

* * * * *